(12) United States Patent
Wu et al.

(10) Patent No.: US 11,144,059 B2
(45) Date of Patent: Oct. 12, 2021

(54) UNMANNED AERIAL VEHICLE OPERATING METHOD AND DEVICE

(71) Applicant: GUANGZHOU XAIRCRAFT TECHNOLOGY CO., LTD, Guangzhou (CN)

(72) Inventors: Bin Wu, Guangzhou (CN); Bin Peng, Guangzhou (CN)

(73) Assignee: GUANGZHOU XAIRCRAFT TECHNOLOGY CO., LTD, Guangzhou (CN)

( * ) Notice: Subject to any disclaimer, the term of this patent is extended or adjusted under 35 U.S.C. 154(b) by 228 days.

(21) Appl. No.: 16/469,883

(22) PCT Filed: Dec. 15, 2017

(86) PCT No.: PCT/CN2017/116521
§ 371 (c)(1),
(2) Date: Jun. 14, 2019

(87) PCT Pub. No.: WO2018/108159
PCT Pub. Date: Jun. 21, 2018

(65) Prior Publication Data
US 2019/0362640 A1   Nov. 28, 2019

(30) Foreign Application Priority Data
Dec. 16, 2016   (CN) .......................... 201611169759.8

(51) Int. Cl.
*G05D 1/00* (2006.01)
*A01M 7/00* (2006.01)
(Continued)

(52) U.S. Cl.
CPC ......... *G05D 1/0094* (2013.01); *A01M 7/0089* (2013.01); *B64C 39/024* (2013.01);
(Continued)

(58) Field of Classification Search
CPC . G05D 1/0094; G05D 1/0055; A01M 7/0089; B64C 39/024; B64C 2201/12;
(Continued)

(56) References Cited

U.S. PATENT DOCUMENTS 10,364,029 B2 *   7/2019   Liu .......................... A01M 7/00
2016/0307448 A1   10/2016  Salnikov
(Continued)

FOREIGN PATENT DOCUMENTS

CN   104881037 A   9/2015
CN   104977935 A   10/2015
(Continued)

OTHER PUBLICATIONS

Antonio Barrientos, Jun. 11, 2011, Aerial Remote Sensing in Agriculture: A Practical Approach to Area Coverage and Path Planning for Fleets of Mini Aerial Robots (http://oa.upm.es/13764/1/J._Field_Robotics_2011_Barrientos.pdf) (Year: 2011).*
(Continued)

*Primary Examiner* — Peter D Nolan
*Assistant Examiner* — Mikko Okechukwu Obioha
(74) *Attorney, Agent, or Firm* — Cantor Colburn LLP (57) ABSTRACT

Provided are an Unmanned Aerial Vehicle (UAV) operating method and device. The method includes that: mapping information of an operation object to be operated is acquired, the mapping information including a safe height, geographic position information and a spray radius, of the operation object; a flight height of the UAV is adjusted to the safe height, and the UAV flies, according to the safe height, to a position corresponding to the geographic position information; and at the position corresponding to the geographic position information, a spiral spraying operation is performed on the operation object based on the spray radius (103).

18 Claims, 4 Drawing Sheets

(51) Int. Cl.
  B64C 39/02    (2006.01)
  B64D 1/18     (2006.01)
  G08G 5/00     (2006.01)
  G05D 1/10     (2006.01)
(52) U.S. Cl.
  CPC ............. B64D 1/18 (2013.01); G05D 1/0055 (2013.01); G05D 1/10 (2013.01); G08G 5/003 (2013.01); G08G 5/0069 (2013.01); *B64C 2201/12* (2013.01); *B64C 2201/141* (2013.01)
(58) Field of Classification Search
  CPC .... B64C 2201/141; B64D 1/18; G08G 5/003; G08G 5/0069
  See application file for complete search history.

(56) References Cited

U.S. PATENT DOCUMENTS

2018/0354624 A1\* 12/2018 Liu .................... B64D 1/18
2019/0271992 A1\* 9/2019 Zou ..................... G08G 5/0078
2021/0020057 A1\* 1/2021 Chen ................... G05D 1/0676

FOREIGN PATENT DOCUMENTS

| | | |
|---|---|---|
| CN | 105116911 A | 12/2015 |
| CN | 105739524 A | 7/2016 |
| CN | 106167098 A | 11/2016 |
| DE | 202014002338 U1 | 6/2014 |
| JP | 2002166895 A | 6/2002 |
| JP | 2006121997 A | 5/2006 |
| WO | 2016192024 A1 | 12/2016 |

OTHER PUBLICATIONS

International Search Report for corresponding application PCT/CN2017/116521 filed Dec. 15, 2017: dated Mar. 26, 2018.
European Search Report for corresponding application EP 17881428; Report dated Jul. 28, 2020.

\* cited by examiner

UNMANNED AERIAL VEHICLE OPERATING METHOD AND DEVICE

TECHNICAL FIELD

The present disclosure relates to the technical field of unmanned aerial vehicles, and more particularly to an unmanned aerial vehicle operating method and an unmanned aerial vehicle operating device.

BACKGROUND

An Unmanned Aerial Vehicle (UAV) is a non-manned aircraft. UAVs are widely used in plant protection, urban management, geology, meteorology, electric power, disaster relief, video shooting and other industries.

With the development of a UAV plant protection technology, UAV plant protection has the characteristics of small damage to crops and high utilization rate of pesticides. More and more peasant households or farmers use UAVs for plant protection operations, especially use UAVs for pesticide spraying and fertilizer spraying.

The existing agricultural plant protection UAV operations are generally merely for large-area, small-plant and densely planted crops. These crops are generally planted on flat and open farmlands, so all operating areas can be covered by line-by-line scanning spraying at specified line spacing through UAVs, and the dose of spray is controlled to achieve the purpose of precise spraying.

For crops of fruit type, due to their different growth topography and different heights of the trees, the operating environment is complicated. Therefore, for the crops of fruit type, the UAV plant protection mode is generally to control UAVs manually and remotely to spray pesticides on crops.

However, the mode of controlling UAVs manually and remotely to spray pesticides on crops has the following disadvantages:

First, since the mode of controlling UAVs manually and remotely to spray fruit trees requires the full participation of an operator, the labor cost is high.

Second, fruit trees tend to obstruct people's sights, thereby increasing the difficulty for operators to control UAVs, and resulting in increased manual errors and spray missing of some fruit trees and even fly accidents.

Third, it is difficult to control the dose of spray by manually controlling pesticide spraying, and the effect of precise spraying is not achieved.

SUMMARY

In view of the above problems, the embodiments of the present disclosure have been made in order to provide a UAV operating method and a corresponding UAV operating device, as to overcome the above problems or at least partially to solve the above problems.

To solve the above problem, the embodiments of the present disclosure disclose a UAV operating method. The UAV operating method including: acquiring mapping information of an operation object to be operated, the mapping information including a safe height, geographic position information and a spray radius, of the operation object; adjusting a flight height of the UAV to the safe height, and flying, according to the safe height, to a position corresponding to the geographic position information; and performing, at the position corresponding to the geographic position information, a spiral spraying operation on the operation object based on the spray radius.

As at least one alternative embodiment, there are a plurality of operation objects, the method further including: after completing an operation on a current operation object, reading mapping information of a next operation object, and judging whether a safe height of the next operation object is greater than a safe height of the current operation object; when a judging result is that the safe height of the next operation object is greater than the safe height of the current operation object, adjusting, at the position of the current operation object, the flight height of the UAV to the safe height of the next operation object, flying, according to the adjusted safe height, to a position corresponding to geographic position information of the next operation object, and performing, at the position corresponding to the geographic position information of the next operation object, a spiral spraying operation on the next operation object based on a spray radius of the next operation object; and when a judging result is that the safe height of the next operation object is not greater than the safe height of the current operation object, flying, according to the safe height corresponding to the current operation object, to a position corresponding to a geographic position information of the next operation object, when reaching the position corresponding to the geographic position information of the next operation object, adjusting the safe height to the safe height of the next operation object, and performing, based on the adjusted safe height, a spiral spraying operation on the next operation object according to a spray radius of the next operation object.

As at least one alternative embodiment, the method further including: acquiring a starting position where the UAV takes off and an absolute altitude corresponding to the starting position; after a current flight operation of the UAV is completed, adjusting the flight height of the UAV to a return height, the return height being obtained by increasing the absolute altitude of the UAV by a preset altitude distance; and flying to the starting position according to the return height, and landing at the starting position.

As at least one alternative embodiment, the mapping information further includes an altitude of the operation object and a physical height of the operation object, and the safe height is greater than or equal to a sum of the altitude of the operation object, the physical height of the operation object and a preset spray panel height.

As at least one alternative embodiment, when the safe height is greater than the sum of the altitude of the operation object, the physical height of the operation object and the preset spray panel height, and before performing, at the position corresponding to the geographic position information, the spiral spraying operation on the operation object based on the spray radius, the method further includes: when the UAV is provided with a ground height measuring apparatus, lowering, at the position corresponding to the geographic position information, the flight height of the UAV to a height corresponding to the sum of the altitude of the operation object, the physical height of the operation object and the preset spray panel height.

As at least one alternative embodiment, performing, at the position corresponding to the geographic position information, the spiral spraying operation on the operation object based on the spray radius includes: determining operating parameters required for the spiral spraying operation, the operating parameters including an initial hovering radius, a number of hovers, a pitch, and a helix angular rate, wherein the initial hovering radius is less than or equal to the spray radius; and taking the geographic position information of the operation object as a spiral center, starting to fly around with the initial hovering radius, increasing a corresponding pitch every turn, completing a operation of the operation object when the number of hovers is satisfied and/or the spray radius is reached, and during the flight, rotating a body according to the helix angular rate.

As at least one alternative embodiment, the operation object has at least following attributes: a difference of physical heights between operation objects, or a difference of diameters of circumscribed circles, under orthographic projections, between operation objects is greater than or equal to a preset threshold.

The embodiments of the present disclosure disclose an Unmanned Aerial Vehicle (UAV) operating method, including: acquiring a list of an operation object to be operated, the list of the operation object including mapping information of at least one operation object arranged in sequence, and the mapping information including a safe height, geographic position information and a spray radius, of the operation object; acquiring one operation object selected from the list of the operation object as a current operation object, and reading mapping information of the current operation object; adjusting a flight height of the UAV to a safe height of the current operation object, and flying, according to the safe height, to a position corresponding to geographic position information of the current operation object; performing, at the position corresponding to the geographic position information of the current operation object, a spraying operation on the current operation object based on a spray radius of the current operation object; after completing an operation on the current operation object, reading mapping information of a next operation object, and judging whether a safe height of the next operation object is greater than the safe height of the current operation object; when a judging result is that the safe height of the next operation object is greater than the safe height of the current operation object, adjusting, at the position of the current operation object, the flight height of the UAV to the safe height of the next operation object, flying, according to the adjusted safe height, to a position corresponding to geographic position information of the next operation object, and performing, at the position corresponding to the geographic position information of the next operation object, a spraying operation on the next operation object based on a spray radius of the next operation object; and when a judging result is that the safe height of the next operation object is not greater than the safe height of the current operation object, flying, according to the safe height corresponding to the current operation object, to the position corresponding to the geographic position information of the next operation object, after reaching the position corresponding to the geographic position information of the next operation object, adjusting the safe height to the safe height of the next operation object, and performing, based on the adjusted safe height, a spraying operation on the next operation object according to the spray radius of the next operation object.

As at least one alternative embodiment, the method further including: acquiring a starting position where the UAV takes off and an absolute altitude corresponding to the starting position; after the operation of all operation objects in the list of the operation object is completed, adjusting the flight height of the UAV to a return height, the return height being obtained by increasing the absolute altitude of the UAV by a preset altitude distance; and flying to the starting position according to the return height, and landing at the starting position.

As at least one alternative embodiment, the mapping information further includes an altitude of the operation object and a physical height of the operation object, and the safe height is greater than or equal to a sum of the altitude of the operation object, the physical height of the operation object and a preset spray panel height.

As at least one alternative embodiment, when a safe height of a certain operation object is greater than or equal to the sum of the altitude of the operation object, the physical height of the operation object and the preset spray panel height, the method further includes: when the operation object is provided with a ground height measuring apparatus, lowering, at the position corresponding to the geographic position information of the operation object, the flight height of the UAV to a height corresponding to the sum of the altitude of the operation object, the physical height of the operation object and the preset spray panel height before performing a spraying operation on the operation object.

As at least one alternative embodiment, the spraying operation includes a spiral spraying operation, and the spiral spraying operation includes: determining operating parameters required for the spiral spraying operation, the operating parameters including an initial hovering radius, a number of hovers, a pitch, and a helix angular rate, wherein the initial hovering radius is less than or equal to the spray radius; and taking the geographic position information of the operation object as a spiral center, starting to fly around with the initial hovering radius, increasing a corresponding pitch every turn, completing the operation of the operation object when the number of hovers is satisfied and/or the spray radius is reached, and during the flight, rotating a body according to the helix angular rate.

As at least one alternative embodiment, the operation object has at least following attributes: a difference of physical heights between operation objects, or a difference of diameters of circumscribed circles, under orthographic projections, between operation objects is greater than or equal to a preset threshold.

The embodiments of the present disclosure disclose an Unmanned Aerial Vehicle (UAV) operating device, including: a mapping information acquiring component, configured to acquire mapping information of an operation object to be operated, the mapping information including a safe height, geographic position information and a spray radius, of the operation object; a first safe height adjusting component, configured to adjust a flight height of the UAV to the safe height; a first flight component, configured to fly, according to the safe height, to a position corresponding to the geographic position information; and a spiral spraying component, configured to perform, at the position corresponding to the geographic position information, a spiral spraying operation on the operation object based on the spray radius.

The embodiments of the present disclosure disclose an Unmanned Aerial Vehicle (UAV) operating device, including: an operation object list acquiring component, configured to acquire a list of an operation object to be operated, the list of the operation object including mapping information of at least one operation object arranged in sequence, and the mapping information including a safe height, geographic position information and a spray radius, of the operation object; a mapping information reading component, configured to acquire one operation object selected from the list of the operation object as a current operation object, and reading mapping information of the current operation object; a second safe height adjusting component, configured to adjust a flight height of the UAV to a safe height of the current operation object; a second flight component, configured to fly, according to the safe height, to a position corresponding to geographic position information of the current operation object; a spraying component, configured to perform, at the position corresponding to the geographic position information of the current operation object, a spraying operation on the current operation object based on a spray radius of the current operation object; a judging component, configured to read, after the operation of the current operation object is completed, mapping information of a next operation object, judge whether a safe height of the next operation object is greater than the safe height of the current operation object, when a judging result is that the safe height of the next operation object is greater than the safe height of the current operation object, call a first height adjusting component, and when a judging result is that the safe height of the next operation object is not greater than the safe height of the current operation object, call a second height adjusting component; the first height adjusting component, configured to adjust, at the position of the current operation object, the flight height of the UAV to the safe height of the next operation object, call the second flight component to fly, according to the adjusted safe height, to a position corresponding to geographic position information of the next operation object, and call the spraying component to perform, at the position corresponding to the geographic position information of the next operation object, a spraying operation on the next operation object based on a spray radius of the next operation object; and the second height adjusting component, configured to fly, according to the safe height corresponding to the current operation object, to the position corresponding to the geographic position information of the next operation object, adjust the safe height to the safe height of the next operation object after reaching the position corresponding to the geographic position information of the next operation object, and call the spraying component to perform, based on the adjusted safe height, a spraying operation on the next operation object according to the spray radius of the next operation object.

The embodiments of the present disclosure include the following advantages:

The embodiments of the present disclosure may be applied to UAV plant protection operations in a complicated operation environment where the crop growth topography is not flat and not open or physical heights and physical widths of crops are inconsistent. By mapping the geographic information and growth condition of each crop in advance, a UAV flies autonomously to each crop to perform spiral flight with a continuous flight curve, performs coverage spray on each crop, and accurately controls the dose according to a spiral state, so as to achieve the effect of precise spraying.

Moreover, the embodiments of the present disclosure do not require full manual participation, thereby saving labor costs, improving spraying efficiency, and reducing the probability of errors caused by manual spraying, the probability of spray missing, and the probability of re-spraying.

BRIEF DESCRIPTION OF THE DRAWINGS

The accompanying drawings described herein are used to provide a further understanding of the present disclosure, and constitute a part of the present application, and the exemplary embodiments of the present disclosure and the description thereof are used to explain the present disclosure, but do not constitute improper limitations to the present disclosure. In the drawings.

DETAILED DESCRIPTION OF THE EMBODIMENTS

In order to make the above objects, features and advantages of the present disclosure become more apparent and understood, the present disclosure is further described in detail below with reference to the drawings and specific implementation manners.

Figure 1:
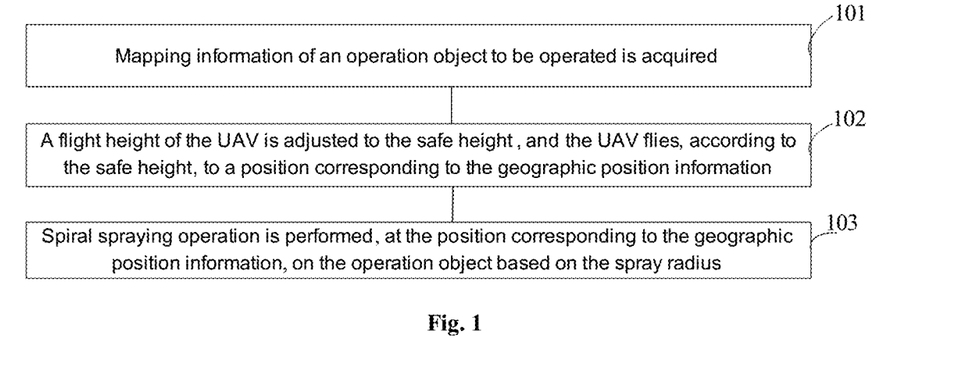
FIG. 1 is a step flowchart of a UAV operating method according to a first method embodiment of the present disclosure.

Referring to FIG. 1, it shows a step flowchart of a UAV operating method according to a first method embodiment of the present disclosure.

In at least one alternative implementation, a flight control system (referred to as a flight controller) may control a UAV to complete the whole flight process such as take-off, flight in the air, task execution and flight return. The role of the flight controller for a UAV is equivalent to the role of a driver for a manned aircraft. It is one of the core technologies of the UAV.

A ground station may communicate with the UAV. In the implementation, the ground station may be a handheld ground station, which may be built with a high-precision GPS for supporting rapid mapping of irregular block boundaries. When the ground station is used, there is no need to connect a computer, so that UAV flight parameters may be adjusted directly. The ground station has an intelligent route planning function, and supports to preset the spray point switch, and the phenomenon of re-spraying or spray missing during the operation can be effectively avoided. During the spraying process, a user may also monitor the flight and spraying status in real time through the ground station, so that the spraying is more precise and efficient.

The embodiments of the present disclosure refer to the side of a UAV, and the method may As at least one alternative embodiment include the steps as follows.

At step 101, mapping information of an operation object to be operated is acquired.

In at least one alternative implementation, there may be one or more operation objects to be operated, and when there is more than one operation object to be operated, a list of an operation object of the one or more operation objects may be acquired, wherein the list of the operation object may include mapping information of each operation object.

The embodiments of the present disclosure may be applied to plant protection operations in uneven and/or non-open ground. The operation object in the embodiments of the present disclosure may at least have the following attributes: a difference of physical heights between operation objects, or a difference of diameters of circumscribed circles, under orthographic projections, between operation objects is greater than or equal to a preset threshold.

As an example, the operation object may include, but is not limited to, a fruit type crop.

The fruit type crop may grow under different topography, and physical heights (a distance between a surface height and the top of a tree) of trees and physical widths (the diameter of a circumscribed circle under a vertical projection plane of a tree or the widths of outermost leaves) of trees are greatly different.

As a preferred example for the embodiments of the present disclosure, the mapping information may include, but is not limited to, an altitude, a physical height, a physical width, a safe height, geographic position information and a spray radius, of an operation object.

As at least one alternative embodiment, the safe height refers to the flight height of the safe and unobstructed flight of the UAV. The safe height may be greater than or equal to a sum of the altitude of the operation object and physical height of the operation object and a preset spray panel height.

As at least one alternative embodiment, the altitude of the operation object and physical height of the operation object are obtained according to measurement.

The spray panel height refers to the height of spraying greatly to the top of a tree by the UAV, that is, the height at which the best spraying effect is achieved when the distance between the UAV and the top of the operation object is h meters. This value may be preset by an operator or developer according to the experience. For example, the value may be set to 1 m, which indicates that the best spraying effect is achieved when the distance between the UAV and the top of the operation object is 1 m.

It is to be noted that the spray panel height of each operation object may be the same, or may be set according to the growth attribute and the growth environment of the operation object, which is not limited in the embodiments of the present disclosure.

Figure 2:
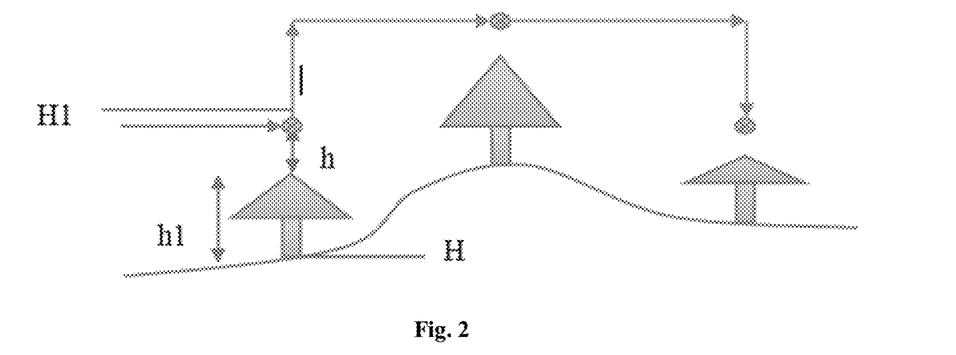
FIG. 2 is a schematic diagram of a spray height of an operation object in a UAV operating method according to a first method embodiment of the present disclosure.

For example, as shown in a schematic diagram of a spray height of an operation object of FIG. 2, assuming that an obtained altitude of a tree is H, a physical height is h1 and a set spray panel height is h, the safe height may be set to be greater than or equal to H+h1+h.

In practice, when the UAV has a ground height measuring apparatus, since the tree height is difficult to measure accurately, the safe height may be set to be greater than H+h1+h.

The ground height measuring apparatus refers to a sensor that detects the distance between the UAV and an object below the UAV, and may include an ultrasonic radar, a radio radar, a Time of Flight (TOF), a laser radar, and the like.

The geographic position information may be a center point latitude and longitude of the operation object. For example, when the operation object is a fruit tree, the center point of the operation object may be a tree trunk or the center of a circumscribed circle of a vertical projection plane of the tree; and the spray radius may be the distance between the outermost leaves and the tree trunk or the radius of the above-mentioned circumscribed circle, and during the spraying operation, within the spray radius, it is necessary to spray into place.

In practice, when the UAV acquires the list of an operation object, when the list of the operation object is displayed, operation objects may be managed according to the corresponding geographic position information and arranged and numbered, the numbers of the operation objects are put on a vertical projection map of the operation task, and the operator may select an operation object to be operated currently as needed.

The operation objects may be numbered in an order of mapping, or scanned and arranged in a certain direction, such as the north direction. When it is plant protection on the hillside, they may be arranged in layers from low to high.

In at least one alternative implementation, the UAV may acquire the mapping information of the operation object from a ground station through a data link, and the mapping information in the ground station may be obtained by a mapper or aerial survey. For example, an operator may precisely map, through a mapper, each fruit tree in an orchard that needs to be applied with pesticides to obtain corresponding mapping information, and then transmit the mapping information to a server. The server transmits the mapping information to a handheld ground station through a network. Then, the ground station transmits the mapping information to a flight controller of the UAV.

At step 102, a flight height of a UAV is adjusted to the safe height, and the UAV flies to a position corresponding to the geographic position information according to the safe height.

After a UAV acquires the mapping information of the operation object, a safe height of an operation object to be operated currently may be determined from the mapping information. When the UAV is started, a flight height of the UAV may be adjusted to the safe height, and the UAV flies, at a set flight speed according to the safe height, to a position indicated by the geographic position information of the operation object.

In at least one alternative implementation, when the UAV acquires a list of an operation object, the top-ranked operation object in the list of the operation object may be takes as the operation object to be operated currently, and then the UAV flies to each operation object in sequence for operation.

It is to be noted that when the UAV is started, a high-precision GPS mapper in the UAV may also automatically record a starting position of the UAV when taking off (such as the latitude and longitude of a take-off point) and an absolute altitude corresponding to the starting position.

At step 103, spiral spraying operation is performed, at the position corresponding to the geographic position information, on the operation object based on the spray radius.

When the UAV reaches the position corresponding to the geographic position information of the current operation object, before step 103 is performed, the embodiment of the present disclosure may further include the step as follows.

When the UAV is provided with a ground height measuring apparatus, the flight height of the UAV is lowered, at the position corresponding to the geographic position information, to a height corresponding to the sum of the altitude of the operation object, the physical height of the operation object and the preset spray panel height.

As at least one alternative embodiment, when the UAV reaches the position corresponding to the geographic position information of the current operation object, before step 103 is performed, a spray height may be first determined. When the UAV is provided with a ground height measuring apparatus, the spray height may be a height corresponding to a sum of an altitude of the current operation object, a physical height of the current operation object and a preset spray panel height. At this time, when the safe height of the UAV is greater than the spray height, the flight height of the UAV may be lowered to the spray height.

Correspondingly, when the UAV is not provided with a ground height measuring apparatus, the safe height may be directly taken as the spray height.

After the spray height is determined, a spiral spraying operation may be performed, at the position corresponding to the geographic position information of the current operation object, on the current operation object based on the spray height according to the spray radius measured above.

In an example embodiment among the embodiments of the present disclosure, step 103 may include the sub-steps as follows.

At sub-step S11, operating parameters required for the spiral spraying operation are determined, the operating parameters including an initial hovering radius, a number of hovers, a pitch, and a helix angular rate, wherein the initial hovering radius is less than or equal to the spray radius.

At sub-step S12, the geographic position information of the operation object is taken as a spiral center, the UAV starts to fly around with the initial hovering radius, the corresponding pitch is increased every turn, the operation of the operation object is completed when the number of hovers is satisfied and/or the spray radius is reached, and during the flight, a body is rotated according to the helix angular rate.

Figure 3:
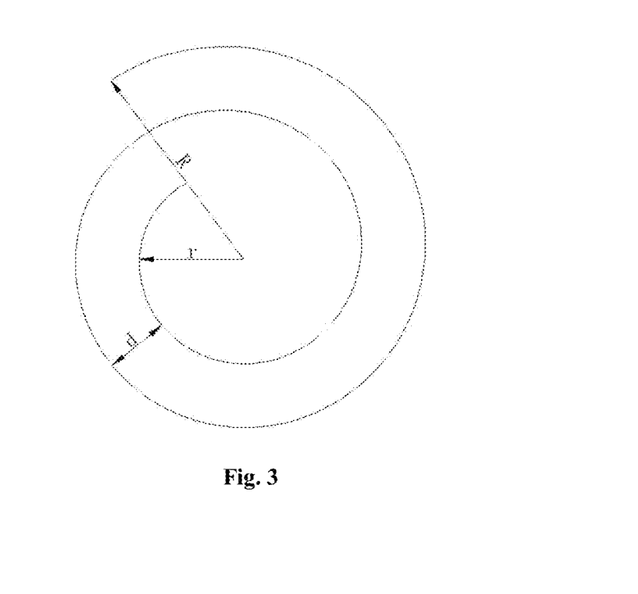
FIG. 3 is a schematic diagram of a spiral spray trajectory in a UAV operating method according to a first method embodiment of the present disclosure.

As at least one alternative embodiment, referring to a schematic diagram of a spiral spray trajectory shown in FIG. 3, when performing the spiral spraying operation, the UAV may fly according to a flight path of an Archimedes spiral. The Archimedes spiral (also known as a constant velocity spiral) is a trajectory generated by movement of a point away from a fixed point at a constant speed while rotating around the fixed point at a fixed angular velocity.

Before the spiral flight, operating parameters required for the spiral spraying operation may be first determined. As an example, the operating parameters may include, but are not limited to, an initial hovering radius r, a number n of hovers, a pitch d, a helix angular rate, a rotational angular rate, a hovering speed, a spray radius R of a current operation object, and the like.

The initial hovering radius r may be set according to the model of the UAV, the size of the body, the position of a nozzle, and/or actual experimental data. For example, if the UAV is a quadrotor model with a width of 1.5 m, r may be set to be about 0.75 m.

The number of hovers n and the spiral speed may be set according to the actual spray dose of the current operation object. For example, if a tree needs to be sprayed with 1 L of pesticide, and 0.3 L pesticide is sprayed in one turn, the number of hovers may be 3.

The pitch d is the same distance over which the radius is increased every turn, and the pitch $d=(R-r)/n$.

The spiral angular rate refers to the angular rate at which the center of the UAV hovers around the center of the operation object. For example, it takes 5 seconds to spiral for one circle, and the spiral angular rate is $360/5=75$ degrees per second. This value may be artificially set in advance or fixedly set by a flight controller.

The rotational angular rate is an angular velocity of an aircraft rotating relative to the center of the aircraft. The value is controlled by the flight controller. The control effect may be, for example, that a nose or an arm always points to a hovering center during the hovering process.

It is to be noted that in the spiral from the inside to the outside of FIG. 3, the initial hovering radius r is smaller than the spray radius R.

In FIG. 3, the geographic position information of the operation object is taken as a spiral center, the UAV starts to fly around from the center to the outer ring from the inside to the outside with the initial hovering radius, the hovering radius is larger and larger, the radius is increased by the same pitch every turn, and spraying is completed when the hovering radius of the UAV is greater than the set operation circle radius R.

During the spiral operation, the body may be rotated at the same time, and the rotational angular rate and the spiral angular rate are the same, so that a fixed angle may be formed between the pointing direction of the nose and the direction of the center of the UAV relative to the spiral center.

It is to be noted that the embodiments of the present disclosure are not limited to the above-mentioned spiral from the inside to the outside, and the spiral may also be a spiral from the outside to the inside, that is, the initial hovering radius is equal to the spray radius, and the hovering radius is smaller and smaller.

In practice, when the spray radius R is smaller than the spray range of the aircraft, the aircraft may rotationally spray in situ without flying in accordance with the flight path of the Archimedes spiral.

In a preferred embodiment among the embodiments of the present disclosure, if there are multiple operation objects, after the operation of the current operation object is completed, the embodiment of the present disclosure may further include the steps as follows.

A mapping information of a next operation object is read, and whether a safe height of the next operation object is great than the safe height of the current operation object, if so, the flight height of the UAV is adjusted, at the position of the current operation object, to the safe height of the next operation object, the UAV flies to the position corresponding to geographic position information of the next operation object according to the adjusted safe height, and a spiral spraying operation is performed, at the position corresponding to the geographic position information of the next operation object, on the next operation object based on a spray radius of the next operation object. If not, the UAV flies, according to the safe height corresponding to the current operation object, to the position corresponding to the geographic position information of the next operation object, after reaching the position corresponding to the geographic position information of the next operation object, the safe height is adjusted to the safe height of the next operation object, and a spiral spraying operation is performed, based on the adjusted safe height, on the next operation object according to the spray radius of the next operation object.

As at least one alternative embodiment, since the physical height of each operation object is inconsistent, after the operation of the current operation object is completed, mapping information of a next operation object arranged behind the current operation object may be read, a safe height of the next operation object is extracted from the mapping information, it is judged whether the safe height of the next operation object is greater than the safe height of the current operation object, if so, the flight height of the UAV is raised, at the position of the current operation object, to the safe height of the next operation object (when there is a ground height measuring apparatus, the UAV flies to the safe height of the current operation object and then flies to the safe height of the next operation object from the safe height of the current operation object), the UAV is driven to fly, according to the adjusted safe height, to a position corresponding to the geographic position information of the next operation object, and a spiral spraying operation is performed, at the position corresponding to the geographic position information of the next operation object, on the next operation object based on the spray radius of the next operation object with reference to the method described in step 103.

For example, in FIG. 2, the safe height of a left tree is lower than the safe height of a middle tree. When the left tree is sprayed completely, the safe height of the UAV may be first raised, at the position of the left tree, to the safe height of the middle tree, and then the UAV flies to the position of the middle tree according to the safe height of the middle tree. If the UAV is provided with a ground height measuring apparatus, the height of the UAV is lowered, at the position of the middle tree, to the spray height of the middle tree. A spiral spraying operation is performed on the middle tree based on the spray height.

Correspondingly, if the safe height of the next operation object is smaller than the safe height of the current operation object, the UAV may fly, according to the safe height corresponding to the current operation object, to the position corresponding to the geographic position information of the next operation object, after reaching the position corresponding to the geographic position information of the next operation object, the safe height may be adjusted to the safe height or spray height of the next operation object, and a spiral spraying operation is performed, based on the spray radius of the next operation object, on the next operation object with reference to the method described in step 103.

For example, in FIG. 2, the safe height of a right tree is lower than the safe height of a middle tree. When the middle tree is sprayed completely, the UAV may fly to the position of the right tree according to the safe height of the middle tree. Then, the safe height is lowered, at the position of the right tree, to the safe height of the right tree (if there is no ground height measuring apparatus) or the spray height of the right tree (if there is a ground height measuring apparatus). Then, a spiral spraying operation is performed on the right tree based on the spray height.

In a preferred embodiment among the embodiments of the present disclosure, after the operation task of the current flight UAV is completed, the embodiment of the present disclosure may further include the steps as follows.

A starting position where the UAV takes off and an absolute altitude corresponding to the starting position are acquired. After the current flight operation of the UAV is completed, the flight height of the UAV is adjusted to a return height, the return height being obtained by increasing the absolute altitude of the UAV by a preset altitude distance. The UAV flies to the starting position according to the return height, and lands at the starting position.

As at least one alternative embodiment, after the current UAV performs all the current flight operation tasks, the UAV may first acquire a starting position recorded at the time of takeoff and an absolute altitude corresponding to the starting position, and determine a return height according to a sum of the absolute altitude corresponding to the starting position and a preset altitude distance.

The preset altitude distance is used to ensure that the UAV can safely return without hitting obstacles. The distance may be set by an operator or developer according to the actual situation. For example, the distance may be set to 5 m, or when the take-off point of the UAV is at the highest point of an operation block, the preset altitude distance may be set to 3 m.

After determining the return height, the UAV may climb to the return height and fly to the starting position according to the return height. When reaching the starting position, the UAV lands at the starting position.

The embodiments of the present disclosure may be applied to UAV plant protection operations in a complicated operation environment where the crop growth topography is not flat and not open and physical heights and physical widths of crops are inconsistent. By mapping the geographic information and growth condition of each crop in advance, a UAV flies autonomously to each crop to perform spiral flight with a continuous flight curve, performs coverage spray on each crop, and accurately controls the dose according to a spiral state, so as to achieve the effect of precise spraying.

Moreover, the embodiments of the present disclosure do not require full manual participation, thereby saving labor costs, improving spraying efficiency, and reducing the probability of errors caused by manual spraying, the probability of spray missing, and the probability of re-spraying.

Figure 4:
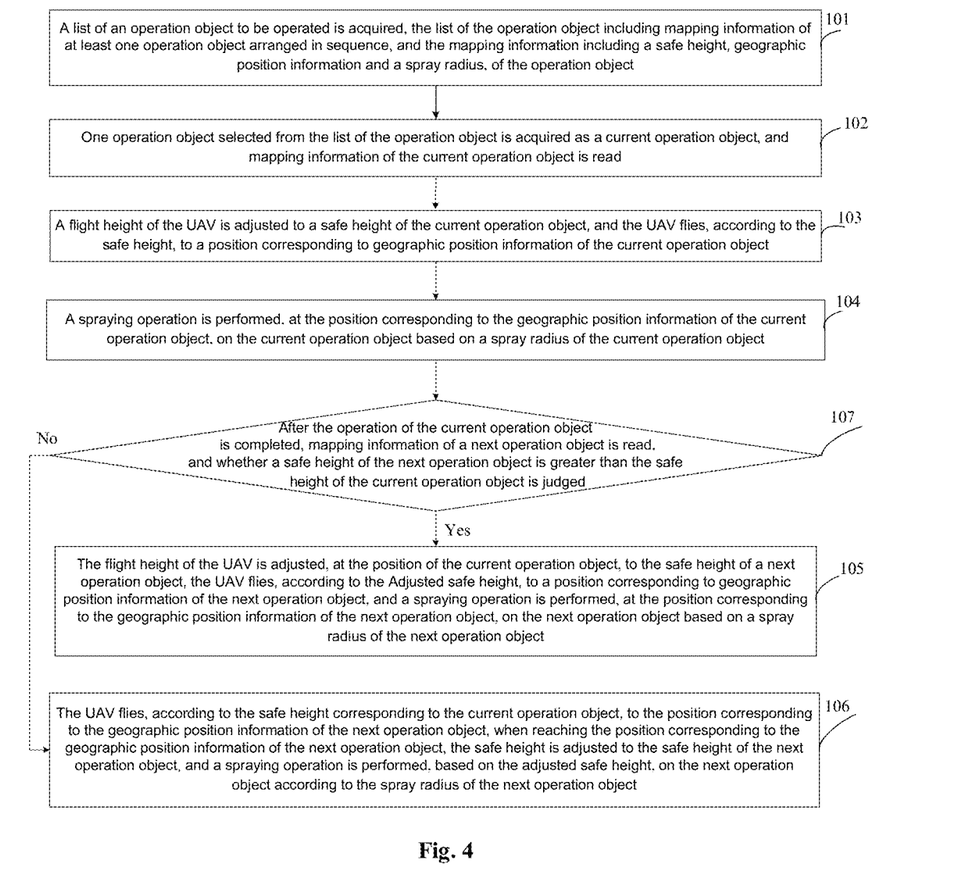
FIG. 4 is a step flowchart of a UAV operating method according to a second method embodiment of the present disclosure.

Referring to FIG. 4, it shows a step flowchart of a UAV operating method according to a second embodiment of the present disclosure. The method may As at least one alternative embodiment include the steps as follows.

At step 201, a list of an operation object to be operated is acquired, the list of the operation object including mapping information of more than one operation object arranged in sequence, and the mapping information including a safe height, geographic position information and a spray radius, of the operation object.

The embodiments of the present disclosure may be applied to plant protection operations in uneven and/or non-open ground. The operation object in the embodiments of the present disclosure may at least have the following attributes: a difference of physical heights between operation objects, or a difference of diameters of circumscribed circles, under orthographic projections, between operation objects is greater than or equal to a preset threshold.

As an example, the operation object may include, but is not limited to, a fruit type crop.

The fruit type crop may grow under different topography, and physical heights (a distance between a surface height and the top of a tree) of trees and physical widths (the diameter of a circumscribed circle under a vertical projection plane of a tree or the widths of outermost leaves) of trees are greatly different.

In at least one alternative implementation, the list of the operation object may include mapping information of multiple operation objects.

As a preferred example for the embodiments of the present disclosure, the mapping information may include, but is not limited to, an altitude, a physical height, a physical width, a safe height, geographic position information and a spray radius of an operation object.

As at least one alternative embodiment, the safe height refers to the flight height of the safe and unobstructed flight of the UAV. The value of the safe height may be greater than or equal to a sum of the altitude and physical height of the operation object and a preset spray panel height.

As at least one alternative embodiment, the altitude of the operation object and physical height of the operation object are obtained according to measurement.

The spray panel height refers to the height of spraying greatly to the top of a tree by the UAV, that is, the height at which the best spraying effect is achieved when the distance between the UAV and the top of the operation object is h meters. This value may be preset by an operator or developer according to the experience. For example, the value is set to 1 m, which indicates that the best spraying effect is achieved when the distance between the UAV and the top of the operation object is 1 m.

It is to be noted that the spray panel height of each operation object may be the same, or may be set according to the growth attribute and the growth environment of the operation object, which is not limited in the embodiments of the present disclosure.

For example, as shown in a schematic diagram of a spray height of an operation object of FIG. 2, assuming that an altitude of a tree is H, a physical height is h1 and a set spray panel height is h, the safe height may be set to be greater than or equal to H+h1+h.

In practice, if the UAV has a ground height measuring apparatus, since the tree height is difficult to measure accurately, the safe height may be set to be greater than H+h1+h.

The geographic position information may be a center point latitude and longitude of the operation object. For example, if the operation object is a fruit tree, the center point of the operation object may be a tree trunk or the center of a circumscribed circle under a vertical projection plane of the tree; and the spray radius may be the distance between the outermost leaves and the tree trunk or the radius of the above-mentioned circumscribed circle, and during the spraying operation, within the spray radius, it is necessary to spray into place.

In practice, when the list of the operation object is displayed, operation objects may be managed according to the corresponding geographic position information and arranged and numbered, the numbers of the operation objects are put on a vertical projection map of the operation task, and the operator may select an operation object to be operated currently as needed.

The operation objects may be numbered in an order of mapping, or scanned and arranged in a certain direction, such as the north direction. If it is plant protection on the hillside, they may be arranged in layers from low to high.

In at least one alternative implementation, the UAV may acquire the list of the operation object from a ground station through a data link, and the mapping information in the ground station may be obtained by a mapper or aerial survey. For example, an operator may precisely map, through a mapper, each fruit tree in an orchard that needs to be applied with pesticides to obtain corresponding mapping information, and then transmit the mapping information to a server. The server transmits the mapping information to a handheld ground station through a network. Then, the ground station transmits the mapping information to a flight controller of the UAV.

At step 202, an operation object selected from the list of the operation object is acquired as a current operation object, and mapping information of the current operation object is read.

After the UAV acquires the list of an operation object, the top-ranked operation object in the list of the operation object may be used as the operation object to be operated currently, and then the UAV flies to each operation object in sequence for operation.

Alternatively, the UAV may also acquire an operation object selected by an operator from the list of the operation object as the current operation object, which is not limited by the embodiments of the present disclosure.

It is to be noted that when the UAV is started, a high-precision GPS mapper in the UAV may also automatically record a starting position of the UAV when taking off (such as the latitude and longitude of a take-off point) and an absolute altitude corresponding to the starting position.

At step 203, a flight height of the UAV is adjusted to a safe height of the current operation object, and the UAV flies, according to the safe height, to a position corresponding to geographic position information of the current operation object.

After a UAV acquires mapping information of a current operation object, a safe height of the current operation object may be determined from the mapping information. When the UAV is started, a flight height of the UAV may be adjusted to the safe height, and the UAV flies, according to the safe height and a set flight speed, to a position indicated by the geographic position information of the current operation object.

At step 204, a spraying operation is performed, at the position corresponding to the geographic position information of the current operation object, on the current operation object based on a spray radius of the current operation object.

When the UAV reaches the position corresponding to the geographic position information of the current operation object, if the safe height of the current operation object is greater than a sum of an altitude of the operation object, a physical height of the operation object and a preset spray panel height, before step 204 is performed, the embodiment of the present disclosure may further include the step as follows.

If the operation object is provided with a ground height measuring apparatus, before performing a spraying operation on the operation object, the flight height of the UAV is lowered, at the position corresponding to the geographic position information of the operation object, to a height corresponding to the sum of the altitude of the operation object, the physical height of the operation object and the preset spray panel height.

As at least one alternative embodiment, when the UAV reaches the position corresponding to the geographic position information of the current operation object, before step 204 is performed, a spray height may be first determined. If the UAV is provided with a ground height measuring apparatus, the spray height may be a height corresponding to a sum of an altitude of the current operation, a physical height of the current operation object and a preset spray panel height. At this time, if the safe height of the UAV is greater than the spray height, the flight height of the UAV may be lowered to the spray height.

Correspondingly, if the UAV is not provided with a ground height measuring apparatus, the safe height may be directly taken as the spray height.

After the spray height is determined, a spraying operation may be performed, at the position corresponding to the geographic position information of the current operation object, on the current operation object based on the spray height.

In a preferred embodiment among the embodiments of the present disclosure, the spraying operation includes a spiral spraying operation, and the spiral spraying operation refers to that the UAV may perform a spraying operation according to a flight path of an Archimedes spiral.

In a preferred embodiment among the embodiments of the present disclosure, step 204 may include the sub-steps as follows.

At sub-step S21, operating parameters required for the spiral spraying operation are determined, the operating parameters including an initial hovering radius, a number of hovers, a pitch, and a helix angular rate, wherein the initial hovering radius is less than or equal to the spray radius.

At sub-step S22, the geographic position information of the operation object to be operated is taken as a spiral center, the UAV starts to fly around with the initial hovering radius, the corresponding pitch is increased every turn, the operation of the operation object is completed when the number of hovers is satisfied and/or the spray radius is reached, and during the flight, a body is rotated according to the helix angular rate.

Before the spiral flight, operating parameters required for the spiral spraying operation may be first determined. As an example, the operating parameters may include, but are not limited to, an initial hovering radius r, a number n of hovers, a pitch d, a helix angular rate, a rotational angular rate, a hovering speed, a spray radius R of a current operation object, and the like.

The initial hovering radius r may be set according to the model of the UAV, the size of the body, the position of a nozzle, and/or actual experimental data. For example, if the UAV is a quadrotor model with a width of 1.5 m, r may be set to be about 0.75 m.

The number of hovers n and the spiral speed may be set according to the actual spray dose of the current operation object. For example, if a tree needs to be sprayed with 1 L of pesticide, and 0.3 L pesticide is sprayed in one turn, the number of hovers may be 3.

The pitch d is the same distance over which the radius is increased every turn, and the pitch d=(R−r)/n.

The spiral angular rate refers to the angular rate at which the center of the UAV hovers around the center of the operation object. For example, it takes 5 seconds to spiral for one circle, and the spiral angular rate is 360/5=75 degrees per second. This value may be artificially set in advance or fixedly set by a flight controller.

The rotational angular rate is an angular velocity of an aircraft rotating relative to the center of the aircraft. The value is controlled by the flight controller. The control effect may be, for example, that a nose or an arm always points to a hovering center during the hovering process.

It is to be noted that in the spiral from the inside to the outside of FIG. 3, the initial hovering radius r is smaller than the spray radius R.

In FIG. 3, the geographic position information of the operation object is taken as a spiral center, the UAV starts to fly around from the center to the outer ring from the inside to the outside with the initial hovering radius, the hovering radius is larger and larger, the radius is increased by the same pitch every turn, and spraying is completed when the hovering radius of the UAV is greater than the set operation circle radius R.

During the spiral operation, the body may be rotated at the same time, and the rotational angular rate and the spiral angular rate are the same, so that a fixed angle may be formed between the pointing direction of the nose and the direction of the center of the UAV relative to the spiral center.

It is to be noted that the embodiments of the present disclosure are not limited to the above-mentioned spiral from the inside to the outside, and the spiral may also be a spiral from the outside to the inside, that is, the hovering radius of the UAV is equal to a set operation circle radius R, and the hovering radius is smaller and smaller.

In practice, when the spray radius R is smaller than the spray range of the aircraft, the aircraft may rotationally spray in situ without flying in accordance with the flight path of the Archimedes spiral.

At step 205, after the operation of the current operation object is completed, mapping information of a next operation object is read, and whether a safe height of the next operation object is greater than the safe height of the current operation object is judged. If so, step 206 is performed. Otherwise, step 207 is performed.

At step 206, the flight height of the UAV is adjusted, at the position of the current operation object, to the safe height of the next operation object, the UAV flies, according to the adjusted safe height, to a position corresponding to geographic position information of the next operation object, and a spraying operation is performed, at the position corresponding to the geographic position information of the next operation object, on the next operation object based on a spray radius of the next operation object.

At step 207, the UAV flies, according to the safe height corresponding to the current operation object, to the position corresponding to the geographic position information of the next operation object, when reaching the position corresponding to the geographic position information of the next operation object, the safe height is adjusted to the safe height of the next operation object, and a spraying operation is performed on the next operation object according to the spray radius of the next operation object based on the adjusted safe height.

Since the physical height of each operation object is inconsistent, after the operation of the current operation object is completed, mapping information of a next operation object arranged behind the current operation object may be read, a safe height of the next operation object is extracted from the mapping information, it is judged whether the safe height of the next operation object is greater than the safe height of the current operation object, if so, the flight height of the UAV is raised, at the position of the current operation object, to the safe height of the next operation object (if there is a ground height measuring apparatus, the UAV flies to the safe height of the current operation object and then flies to the safe height of the next operation object from the safe height of the current operation object), the UAV is driven to fly, according to the adjusted safe height, to a position corresponding to the geographic position information of the next operation object, and a spiral spraying operation is performed, at the position corresponding to the geographic position information of the next operation object, on the next operation object based on the spray radius of the next operation object with reference to the method described in step 204.

If the safe height of the next operation object is smaller than the safe height of the current operation object, the UAV may fly, according to the safe height corresponding to the current operation object, to the position corresponding to the geographic position information of the next operation object, when reaching the position corresponding to the geographic position information of the next operation object, the safe height may be adjusted to the safe height or spray height of the next operation object, and a spiral spraying operation is performed on the next operation object based on the spray radius of the next operation object with reference to the method described in step 204.

In a preferred embodiment among the embodiments of the present disclosure, after the operation task of the current flight UAV is completed, the embodiment of the present disclosure may further include the steps as follows.

A starting position where the UAV takes off and an absolute altitude corresponding to the starting position are acquired. After the operation of all operation objects in the list of the operation object is completed, the flight height of the UAV is adjusted to a return height, the return height being obtained by increasing the absolute altitude of the UAV by a preset altitude distance. The UAV flies to the starting position according to the return height, and lands at the starting position.

The embodiments of the present disclosure may be applied to UAV plant protection operations in a complicated operation environment where the crop growth topography is not flat and not open and physical heights and physical widths of crops are inconsistent. By mapping the geographic information and growth condition of each crop in advance, a UAV may autonomously adjust the safe height of each crop and perform a spraying operation on each crop in sequence without full manual participation, thereby saving labor costs, improving spraying efficiency, and reducing the probability of errors caused by manual spraying, the probability of spray missing, and the probability of re-spraying.

It is to be noted that, for the method embodiments, for the sake of simple description, they are all expressed as a series of action combinations, but those skilled in the art should understand that the embodiments of the present disclosure are not limited by the described action sequence, because certain steps may be performed in other sequences or concurrently in accordance with the embodiments of the present disclosure. In the following, those skilled in the art should also understand that the embodiments described in the specification are all preferred embodiments, and the actions involved are not necessarily required in the embodiments of the present disclosure.

Figure 5:
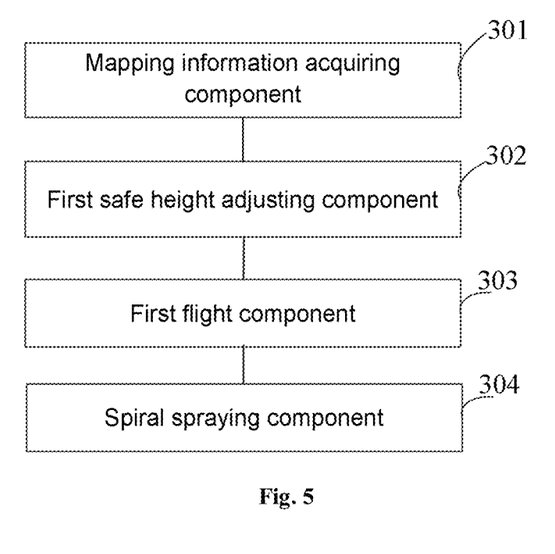
FIG. 5 is a structure block diagram of a UAV operating device according to a first device embodiment of the present disclosure.

Referring to FIG. 5, it shows a structure block diagram of a UAV operating device according to a first device embodiment of the present disclosure. The device may include: a mapping information acquiring component 301, a first safe height adjusting component 302, a first flight component 303, and a spiral spraying component 304.

The mapping information acquiring component 301 is configured to acquire mapping information of an operation object to be operated, the mapping information including a safe height, geographic position information and a spray radius, of the operation object.

The first safe height adjusting component 302 is configured to adjust a flight height of a UAV to the safe height.

The first flight component 303 is configured to fly, according to the safe height, to a position corresponding to the geographic position information.

The spiral spraying component 304 is configured to perform, at the position corresponding to the geographic position information, a spiral spraying operation on the operation object based on the spray radius.

In a preferred embodiment among the embodiments of the present disclosure, if there are multiple operation objects, the device may further include a height judging component, a third height adjusting component and a fourth height adjusting component.

The height judging component is configured to read, after the operation of the current operation object is completed, mapping information of a next operation object, judge whether a safe height of the next operation object is greater than the safe height of the current operation object, if so, call a third height adjusting component, and if not, call a fourth height adjusting component.

The third height adjusting component is configured to adjust, at the position of the current operation object, the flight height of the UAV to the safe height of the next operation object, call the first flight component to fly, according to the adjusted safe height, to a position corresponding to geographic position information of the next operation object, and call the spiral spraying component to perform, at the position corresponding to the geographic position information of the next operation object, a spiral spraying operation on the next operation object based on a spray radius of the next operation object.

The fourth height adjusting component is configured to fly, according to the safe height corresponding to the current operation object, to the position corresponding to the geographic position information of the next operation object, adjust the safe height to the safe height of the next operation object when reaching the position corresponding to the geographic position information of the next operation object, and call the spiral spraying component to perform, according to the spray radius of the next operation object and the adjusted safe height, a spiral spraying operation on the next operation object.

In a preferred embodiment among the embodiments of the present disclosure, the device may further include a first starting information acquiring component, a first return height adjusting component and a first return component.

The first starting information acquiring component is configured to acquire a starting position where the UAV takes off and an absolute altitude corresponding to the starting position.

The first return height adjusting component is configured to adjust, after the current flight operation of the UAV is completed, the flight height of the UAV to a return height, the return height being obtained by increasing the absolute altitude of the UAV by a preset altitude distance.

The first return component is configured to fly to the starting position according to the return height, and land at the starting position.

In a preferred embodiment among the embodiments of the present disclosure, the mapping information may further include an altitude of the operation object, and a physical height of the operation object, and the safe height may be greater than or equal to a sum of the altitude of the operation object, the physical height of the operation object and a preset spray panel height.

In a preferred embodiment among the embodiments of the present disclosure, when the safe height is greater than the sum of the altitude of the operation object, the physical height of the operation object and a preset spray panel height, the device further includes a first height lowering component.

The first height lowering component is configured to lower at the position corresponding to the geographic position information, if the UAV is provided with a ground height measuring apparatus, the flight height of the UAV to a height corresponding to the sum of the altitude of the operation object, the physical height of the operation object and the preset spray panel height.

In a preferred embodiment among the embodiments of the present disclosure, the spiral spraying component 304 includes a first operating parameter determining sub-component and a first spiral flight sub-component.

The first operating parameter determining sub-component is configured to determine operating parameters required for the spiral spraying operation, the operating parameters including an initial hovering radius, a number of hovers, a pitch, and a helix angular rate, wherein the initial hovering radius is less than or equal to the spray radius.

The first spiral flight sub-component is configured to take the geographic position information of the operation object as a spiral center, start to fly around with the initial hovering radius, increase the corresponding pitch every turn, complete the operation of the operation object when the number of hovers is satisfied and/or the spray radius is reached, and during the flight, rotate a body according to the helix angular rate.

In a preferred embodiment among the embodiments of the present disclosure, the operation object at least has the following attributes:

A difference of physical heights between operation objects, or a difference of diameters of circumscribed circles, under orthographic projections, between operation objects is greater than or equal to a preset threshold.

For the method embodiment of FIG. 5, since it is basically similar to the method embodiment of FIG. 1, the description is relatively simple, and the relevant parts may be referred to the description of the method embodiment.

Figure 6:
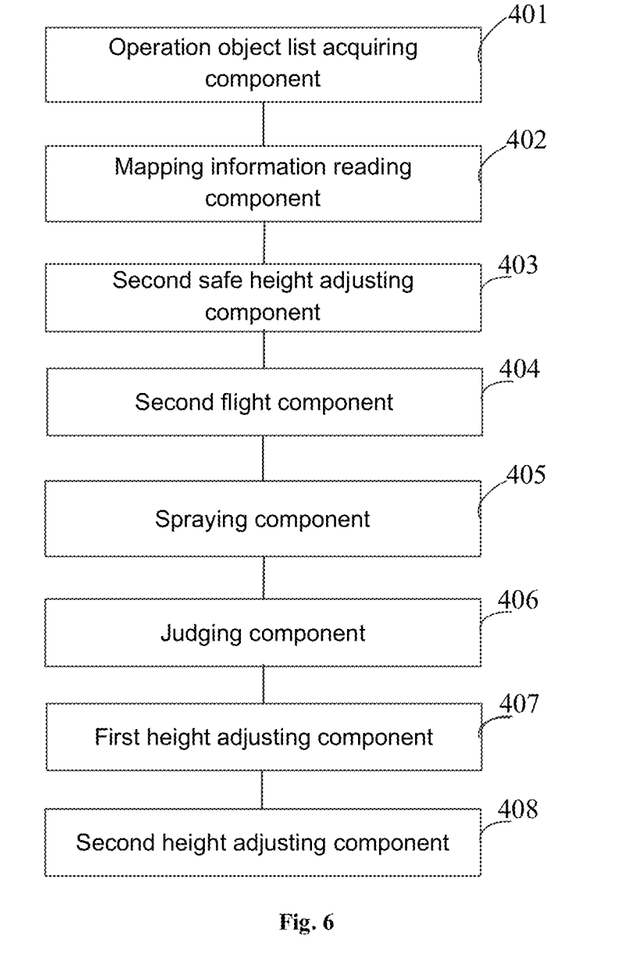
FIG. 6 is a structure block diagram of a UAV operating device according to a second device embodiment of the present disclosure.

Referring to FIG. 6, it shows a structure block diagram of a UAV operating device according to a second device embodiment of the present disclosure. The device may include: an operation object list acquiring component 401, a mapping information reading component 402, a second safe height adjusting component 403, a second flight component 404, a spraying component 405, a judging component 406, a first height adjusting component 407, and a second height adjusting component 408.

The operation object list acquiring component 401 is configured to acquire a list of an operation object to be operated, the list of the operation object including mapping information of more than one operation object arranged in sequence, and the mapping information including a safe height, geographic position information and a spray radius, of the operation object.

The mapping information reading component 402 is configured to acquire one operation object selected from the list of the operation object as a current operation object, and reading mapping information of the current operation object.

The second safe height adjusting component 403 is configured to adjust a flight height of a UAV to a safe height of the current operation object.

The second flight component 404 is configured to fly to a position corresponding to geographic position information of the current operation object according to the safe height.

The spraying component 405 is configured to perform, at the position corresponding to the geographic position information of the current operation object, a spraying operation on the current operation object based on a spray radius of the current operation object.

The judging component 406 is configured to read, after the operation of the current operation object is completed, mapping information of a next operation object, judge whether a safe height of the next operation object is greater than the safe height of the current operation object, if so, call a first height adjusting component, and if not, call a second height adjusting component.

The first height adjusting component 407 is configured to adjust, at the position of the current operation object, the flight height of the UAV to the safe height of the next operation object, call the second flight component to fly to a position corresponding to geographic position information of the next operation object according to the adjusted safe height, and call the spraying component to perform, at the position corresponding to the geographic position information of the next operation object, a spraying operation on the next operation object based on a spray radius of the next operation object.

The second height adjusting component 408 is configured to fly, according to the safe height corresponding to the current operation object, to the position corresponding to the geographic position information of the next operation object, adjust the safe height to the safe height of the next operation object when reaching the position corresponding to the geographic position information of the next operation object, and call the spraying component to perform, based on the adjusted safe height, a spraying operation on the next operation object according to the spray radius of the next operation object.

In a preferred embodiment among the embodiments of the present disclosure, the device may further include a second starting information acquiring component, a second return height adjusting component and a second return component.

The second starting information acquiring component is configured to acquire a starting position where the UAV takes off and an absolute altitude corresponding to the starting position.

The second return height adjusting component is configured to adjust, after the operation of all operation objects in the list of the operation object is completed, the flight height of the UAV to a return height, the return height being obtained by increasing the absolute altitude of the UAV by a preset altitude distance.

The second return component is configured to fly to the starting position according to the return height, and land at the starting position.

In a preferred embodiment among the embodiments of the present disclosure, the mapping information may further include an altitude of the operation object and a physical height of the operation object, and the safe height may be greater than or equal to a sum of the altitude of the operation object, the physical height of the operation object and a preset spray panel height.

In a preferred embodiment among the embodiments of the present disclosure, when the safe height of a certain operation object is greater than the sum of the altitude of the operation object, the physical height of the operation object and a preset spray panel height, the device further includes a second height lowering component.

The second height lowering component is configured to, before performing a spraying operation on the operation object, lower at the position corresponding to the geographic position information of the operation object, if the operation object is provided with a ground height measuring apparatus, the flight height of the UAV to a height corresponding to the sum of the altitude of the operation object, the physical height of the operation object and the preset spray panel height.

In a preferred embodiment among the embodiments of the present disclosure, the spraying operation includes a spiral spraying operation. A second operating parameter determining sub-component and a second spiral flight sub-component are called to perform the spiral spraying operation.

The second operating parameter determining sub-component is configured to determine operating parameters required for the spiral spraying operation, the operating parameters including an initial hovering radius, a number of hovers, a pitch, and a helix angular rate, wherein the initial hovering radius is less than or equal to the spray radius.

The second spiral flight sub-component is configured to take the geographic position information of the operation object as a spiral center, start to fly around with the initial hovering radius, increase the corresponding pitch every turn, complete the operation of the operation object when the number of hovers is satisfied and/or the spray radius is reached, and during the flight, rotate a body according to the helix angular rate.

In a preferred embodiment among the embodiments of the present disclosure, the operation object at least has the following attributes:

A difference of physical heights between operation objects, or a difference of diameters of circumscribed circles, under orthographic projections, between operation objects is greater than or equal to a preset threshold.

For the method embodiment of FIG. 6, since it is basically similar to the method embodiment of FIG. 4, the description is relatively simple, and the relevant parts may be referred to the description of the method embodiment.

Various embodiments in the present specification are described in a progressive manner, each embodiment focuses on differences from other embodiments, and the identical or similar parts between the various embodiments can be referred to each other.

A person skilled in the art should understand that the embodiments of the present disclosure may be provided as a method, an apparatus or a computer program product. Thus, the embodiments of the present disclosure may adopt forms of complete hardware embodiments, complete software embodiments or embodiments integrating software and hardware. Moreover, the embodiments of the present disclosure may adopt the form of a computer program product implemented on one or more computer available storage media (including, but not limited to, a disk memory, a CD-ROM, an optical memory and the like) containing computer available program codes.

The embodiments of the present disclosure are described with reference to flowcharts and/or block diagrams of the method, the terminal device (system) and the computer program product according to the embodiments of the present disclosure. It is to be understood that each flow and/or block in the flowcharts and/or the block diagrams and a combination of the flows and/or the blocks in the flowcharts and/or the block diagrams may be implemented by computer program instructions. These computer program instructions may be provided for a general computer, a dedicated computer, an embedded processor or processors of other programmable data processing terminal devices to generate a machine, so that an apparatus for achieving functions designated in one or more flows of the flowcharts and/or one or more blocks of the block diagrams is generated via instructions executed by the computers or the processors of the other programmable data processing terminal devices.

These computer program instructions may also be stored in a computer readable memory capable of guiding the computers or the other programmable data processing terminal devices to work in a specific mode, so that a manufactured product including an instruction apparatus is generated via the instructions stored in the computer readable memory, and the instruction apparatus achieves the functions designated in one or more flows of the flowcharts and/or one or more blocks of the block diagrams.

These computer program instructions may also be loaded to the computers or the other programmable data processing terminal devices, so that processing implemented by the computers is generated by executing a series of operation steps on the computers or the other programmable terminal devices, and therefore the instructions executed on the computers or the other programmable terminal devices provide a step of achieving the functions designated in one or more flows of the flowcharts and/or one or more blocks of the block diagrams.

While preferred embodiments of the embodiments of the present disclosure have been described, those skilled in the art can make additional changes and modifications to the embodiments once knowing a basic creativity concept. Therefore, the appended claims are intended to be interpreted as including the preferred embodiments and all the changes and modifications falling within the scope of the embodiments of the present disclosure.

Finally, it is also to be noted that relational terms such as first and second are used merely to distinguish one entity or operation from another entity or operation herein, and do not necessarily require or imply the existence of any such actual relationship or order between these entities or operations. Moreover, the terms "include", "contain" or any other variations thereof are intended to cover a non-exclusive inclusion, such that a process, method, article or terminal device including a series of elements not only includes those elements, but also includes those elements that are not explicitly listed, or includes elements inherent to such a process, method, article or terminal device. Under the condition of no more limitations, it is not excluded that additional identical elements exist in the process, method, article or terminal device including elements defined by a sentence "including a . . . ".

The above is a detailed description of a UAV operating method and device provided by the present disclosure. The principle and implementation manner of the present disclosure are described in the specific examples herein. The description of the embodiments is only for helping to understand the method of the present disclosure and its core ideas. Furthermore, for those of ordinary skill in the art, according to the idea of the present disclosure, there will be changes in specific implementation manners and application scopes. In conclusion, the above description should not be taken as limiting the present disclosure.

What is claimed is:

1. An Unmanned Aerial Vehicle (UAV) operating method, comprising:
    acquiring mapping information of an operation object to be operated, the mapping information comprising a safe height, geographic position information and a spray radius, of the operation object;
    adjusting a flight height of the UAV to the safe height, and flying, according to the safe height, to a position corresponding to the geographic position information; and
    performing, at the position corresponding to the geographic position information, a spiral spraying operation on the operation object based on the spray radius;
    wherein performing, at the position corresponding to the geographic position information, the spiral spraying operation on the operation object based on the spray radius comprises:
    determining operating parameters required for the spiral spraying operation, the operating parameters comprising an initial hovering radius, a number of hovers, a pitch, and a helix angular rate, wherein the initial hovering radius is less than or equal to the spray radius; and
    taking the geographic position information of the operation object as a spiral center, starting to fly around with the initial hovering radius, increasing a corresponding pitch every turn, completing a operation of the operation object when the number of hovers is satisfied and/or the spray radius is reached, and during the flight, rotating a body according to the helix angular rate.

2. The method as claimed in claim 1, wherein there are a plurality of operation objects, the method further comprising:

after completing an operation on a current operation object, reading mapping information of a next operation object, and judging whether a safe height of the next operation object is greater than a safe height of the current operation object;

when a judging result is that the safe height of the next operation object is greater than the safe height of the current operation object, adjusting, at the position of the current operation object, the flight height of the UAV to the safe height of the next operation object, flying, according to the adjusted safe height, to a position corresponding to geographic position information of the next operation object, and performing, at the position corresponding to the geographic position information of the next operation object, a spiral spraying operation on the next operation object based on a spray radius of the next operation object; and when a judging result is that the safe height of the next operation object is not greater than the safe height of the current operation object, flying, according to the safe height corresponding to the current operation object, to a position corresponding to a geographic position information of the next operation object, when reaching the position corresponding to the geographic position information of the next operation object, adjusting the safe height to the safe height of the next operation object, and performing, based on the adjusted safe height, a spiral spraying operation on the next operation object according to a spray radius of the next operation object.

3. The method as claimed in claim 2, further comprising:

acquiring a starting position where the UAV takes off and an absolute altitude corresponding to the starting position;

after a current flight operation of the UAV is completed, adjusting the flight height of the UAV to a return height, the return height being obtained by increasing the absolute altitude of the UAV by a preset altitude distance; and flying to the starting position according to the return height, and landing at the starting position.

4. The method as claimed in claim 1, wherein the mapping information further comprises an altitude of the operation object and a physical height of the operation object, and the safe height is greater than or equal to a sum of the altitude of the operation object, the physical height of the operation object and a preset spray panel height.

5. The method as claimed in claim 4, wherein when the safe height is greater than the sum of the altitude of the operation object, the physical height of the operation object and the preset spray panel height, and before performing, at the position corresponding to the geographic position information, the spiral spraying operation on the operation object based on the spray radius, the method further comprises:

when the UAV is provided with a ground height measuring apparatus, lowering, at the position corresponding to the geographic position information, the flight height of the UAV to a height corresponding to the sum of the altitude of the operation object, the physical height of the operation object and the preset spray panel height.

6. The method as claimed in claim 1, wherein the operation object has at least following attributes:

a difference of physical heights between operation objects, or a difference of diameters of circumscribed circles, under orthographic projections, between operation objects is greater than or equal to a preset threshold.

7. An Unmanned Aerial Vehicle (UAV) operating method, comprising:

acquiring a list of an operation object to be operated, the list of the operation object comprising mapping information of at least one operation object arranged in sequence, and the mapping information comprising a safe height, geographic position information and a spray radius, of the operation object;

acquiring one operation object selected from the list of the operation object as a current operation object, and reading mapping information of the current operation object;

adjusting a flight height of the UAV to a safe height of the current operation object, and flying, according to the safe height, to a position corresponding to geographic position information of the current operation object;

performing, at the position corresponding to the geographic position information of the current operation object, a spraying operation on the current operation object based on a spray radius of the current operation object;

after completing an operation on the current operation object, reading mapping information of a next operation object, and judging whether a safe height of the next operation object is greater than the safe height of the current operation object;

when a judging result is that the safe height of the next operation object is greater than the safe height of the current operation object, adjusting, at the position of the current operation object, the flight height of the UAV to the safe height of the next operation object, flying, according to the adjusted safe height, to a position corresponding to geographic position information of the next operation object, and performing, at the position corresponding to the geographic position information of the next operation object, a spraying operation on the next operation object based on a spray radius of the next operation object; and when a judging result is that the safe height of the next operation object is not greater than the safe height of the current operation object, flying, according to the safe height corresponding to the current operation object, to the position corresponding to the geographic position information of the next operation object, after reaching the position corresponding to the geographic position information of the next operation object, adjusting the safe height to the safe height of the next operation object, and performing, based on the adjusted safe height, a spraying operation on the next operation object according to the spray radius of the next operation object;

wherein the spraying operation comprises a spiral spraying operation, and the spiral spraying operation comprises:

determining operating parameters required for the spiral spraying operation, the operating parameters comprising an initial hovering radius, a number of hovers, a pitch, and a helix angular rate, wherein the initial hovering radius is less than or equal to the spray radius; and taking the geographic position information of the operation object as a spiral center, starting to fly around with the initial hovering radius, increasing a corresponding pitch every turn, completing the operation of the operation object when the number of hovers is satisfied and/or the spray radius is reached, and during the flight, rotating a body according to the helix angular rate.

8. The method as claimed in claim 7, further comprising:
acquiring a starting position where the UAV takes off and an absolute altitude corresponding to the starting position;

after the operation of all operation objects in the list of the operation object is completed, adjusting the flight height of the UAV to a return height, the return height being obtained by increasing the absolute altitude of the UAV by a preset altitude distance; and flying to the starting position according to the return height, and landing at the starting position.

9. The method as claimed in claim 7, wherein the mapping information further comprises an altitude of the operation object and a physical height of the operation object, and the safe height is greater than or equal to a sum of the altitude of the operation object, the physical height of the operation object and a preset spray panel height.

10. The method as claimed in claim 9, wherein when a safe height of a certain operation object is greater than or equal to the sum of the altitude of the operation object, the physical height of the operation object and the preset spray panel height, the method further comprises:

when the operation object is provided with a ground height measuring apparatus, lowering, at the position corresponding to the geographic position information of the operation object, the flight height of the UAV to a height corresponding to the sum of the altitude of the operation object, the physical height of the operation object and the preset spray panel height before performing a spraying operation on the operation object.

11. The method as claimed in claim 7, wherein the operation object has at least following attributes:

a difference of physical heights between operation objects, or a difference of diameters of circumscribed circles, under orthographic projections, between operation objects is greater than or equal to a preset threshold.

12. An Unmanned Aerial Vehicle (UAV) operating device, comprising:

a mapping information acquiring component, configured to acquire mapping information of an operation object to be operated, the mapping information comprising a safe height, geographic position information and a spray radius, of the operation object;

a first safe height adjusting component, configured to adjust a flight height of the UAV to the safe height;

a first flight component, configured to fly, according to the safe height, to a position corresponding to the geographic position information; and a spiral spraying component, configured to perform, at the position corresponding to the geographic position information, a spiral spraying operation on the operation object based on the spray radius;

wherein the spiral spraying component is further configured to:

determine operating parameters required for the spiral spraying operation, the operating parameters comprising an initial hovering radius, a number of hovers, a pitch, and a helix angular rate, wherein the initial hovering radius is less than or equal to the spray radius; and take the geographic position information of the operation object as a spiral center, started to fly around with the initial hovering radius, increase a corresponding pitch every turn, complete a operation of the operation object when the number of hovers is satisfied and/or the spray radius is reached, and during the flight, rotate a body according to the helix angular rate.

13. The method as claimed in claim 2, wherein performing, at the position corresponding to the geographic position information, the spiral spraying operation on the operation object based on the spray radius comprises:

determining operating parameters required for the spiral spraying operation, the operating parameters comprising an initial hovering radius, a number of hovers, a pitch, and a helix angular rate, wherein the initial hovering radius is less than or equal to the spray radius; and taking the geographic position information of the operation object as a spiral center, starting to fly around with the initial hovering radius, increasing a corresponding pitch every turn, completing a operation of the operation object when the number of hovers is satisfied and/or the spray radius is reached, and during the flight, rotating a body according to the helix angular rate.

14. The method as claimed in claim 3, wherein performing, at the position corresponding to the geographic position information, the spiral spraying operation on the operation object based on the spray radius comprises:

determining operating parameters required for the spiral spraying operation, the operating parameters comprising an initial hovering radius, a number of hovers, a pitch, and a helix angular rate, wherein the initial hovering radius is less than or equal to the spray radius; and taking the geographic position information of the operation object as a spiral center, starting to fly around with the initial hovering radius, increasing a corresponding pitch every turn, completing a operation of the operation object when the number of hovers is satisfied and/or the spray radius is reached, and during the flight, rotating a body according to the helix angular rate.

15. The method as claimed in claim 4, wherein performing, at the position corresponding to the geographic position information, the spiral spraying operation on the operation object based on the spray radius comprises:

determining operating parameters required for the spiral spraying operation, the operating parameters comprising an initial hovering radius, a number of hovers, a pitch, and a helix angular rate, wherein the initial hovering radius is less than or equal to the spray radius; and taking the geographic position information of the operation object as a spiral center, starting to fly around with the initial hovering radius, increasing a corresponding pitch every turn, completing a operation of the operation object when the number of hovers is satisfied and/or the spray radius is reached, and during the flight, rotating a body according to the helix angular rate.

16. The method as claimed in claim 5, wherein performing, at the position corresponding to the geographic position information, the spiral spraying operation on the operation object based on the spray radius comprises:

determining operating parameters required for the spiral spraying operation, the operating parameters comprising an initial hovering radius, a number of hovers, a pitch, and a helix angular rate, wherein the initial hovering radius is less than or equal to the spray radius; and taking the geographic position information of the operation object as a spiral center, starting to fly around with the initial hovering radius, increasing a corresponding pitch every turn, completing a operation of the operation object when the number of hovers is satisfied and/or the spray radius is reached, and during the flight, rotating a body according to the helix angular rate.

17. The method as claimed in claim 8, wherein the spraying operation comprises a spiral spraying operation, and the spiral spraying operation comprises:
   determining operating parameters required for the spiral spraying operation, the operating parameters comprising an initial hovering radius, a number of hovers, a pitch, and a helix angular rate, wherein the initial hovering radius is less than or equal to the spray radius; and
   taking the geographic position information of the operation object as a spiral center, starting to fly around with the initial hovering radius, increasing a corresponding pitch every turn, completing the operation of the operation object when the number of hovers is satisfied and/or the spray radius is reached, and during the flight, rotating a body according to the helix angular rate.

18. The device as claimed in claim 12, wherein there are a plurality of operation objects, the device further comprising:
   a height judging component, configured to, after completing an operation on a current operation object, read mapping information of a next operation object, judge whether a safe height of the next operation object is greater than a safe height of the current operation object, when a judging result is that the safe height of the next operation object is greater than the safe height of the current operation object, call a third height adjusting component, and when the judging result is that the safe height of the next operation object is not greater than the safe height of the current operation object, call a fourth height adjusting component;
   the third height adjusting component, configured to adjust, at the position of the current operation object, the flight height of the UAV to the safe height of the next operation object, call the first flight component to fly, according to the adjusted safe height, to a position corresponding to geographic position information of the next operation object, and call the spiral spraying component to perform, at the position corresponding to the geographic position information of the next operation object, a spiral spraying operation on the next operation object based on a spray radius of the next operation object;
   the fourth height adjusting component, configured to fly, according to the safe height corresponding to the current operation object, to the position corresponding to the geographic position information of the next operation object, adjust the safe height to the safe height of the next operation object when reaching the position corresponding to the geographic position information of the next operation object, and call the spiral spraying component to perform, according to the spray radius of the next operation object and the adjusted safe height, a spiral spraying operation on the next operation object.

* * * * *